July 2, 1957 — G. L. BRICE — 2,797,959
SLIDABLE GATE CONSTRUCTION FOR MOTOR VEHICLES
Filed Nov. 29, 1955
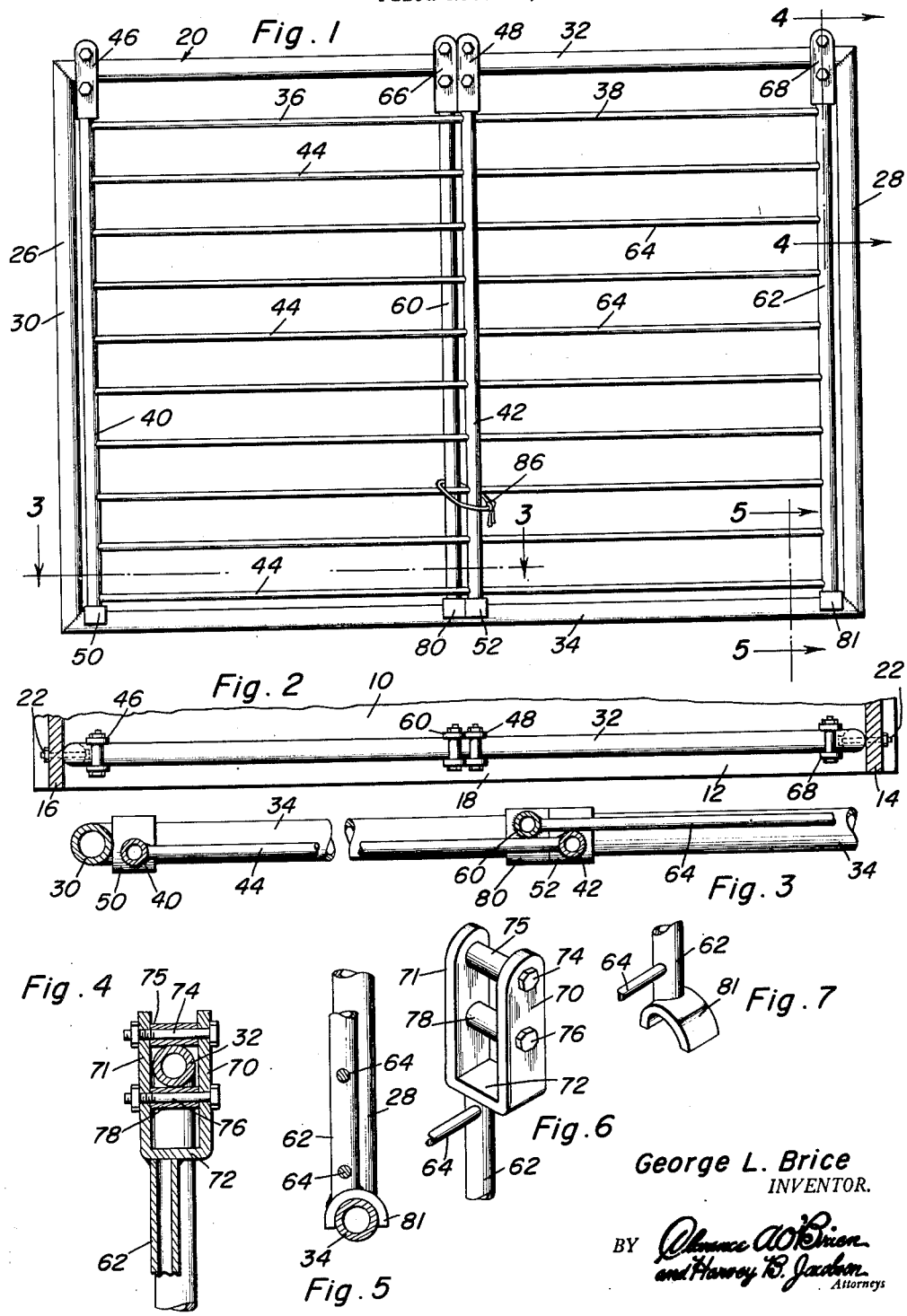
George L. Brice
INVENTOR.

United States Patent Office 2,797,959
Patented July 2, 1957

2,797,959

SLIDABLE GATE CONSTRUCTION FOR MOTOR VEHICLES

George L. Brice, Batesville, Tex.

Application November 29, 1955, Serial No. 549,722

6 Claims. (Cl. 296—50)

This invention relates to closures or gates constructed especially for motor vehicle bodies.

An object of the present invention is to provide an improved closure for the opening of vehices and particularly those vehicles that are used for the transportation of livestock.

Another object of the invention is to provide a closure for a vehicle body, for example a truck or wagon body, the closure having its associated frame of a unitary construction so that when attached to the sides of the vehicle, they are strengthened and made more rigid.

A further object of the invention is to provide a vehicle closure of the multipanel sliding type where the panels slide on a frame to an overlapping position when the closure is opened, each panel being provided with improved hangers for supporting them, the panels being connected to the hangers at an offset position thereon so that a single header is used to support the panels, the panels being overlapped at their junction.

Another object is to provide a closure which incorporates features of safety for the livestock and the personnel handling the livestock. This is the case since the gate is of unusual strength and need not be removed or swung outwardly or inwardly in order to load or unload the vehicle, it being necessary only to slide one or both of the closures so that they overlap thereby forming an opening for the entrance or discharge of the cattle or other livestock.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the closure exemplifying the principles of the invention;

Figure 2 is a horizontal sectional view of a typical vehicle in which the closure of Figure 1 is mounted;

Figure 3 is an enlarged sectional view taken on the line 3—3 of Figure 1 and in the direction of the arrows;

Figure 4 is a sectional view taken on the line 4—4 of Figure 1;

Figure 5 is a sectional view taken on the line 5—5 of Figure 1;

Figure 6 is a perspective view of one of the hangers at the top of one of the panels; and Figure 7 is a perspective view of one of the shoes slidable on the sill of the gate construction aiding to support the panels.

In the accompanying drawing there is a vehicle body 10 fragmentarily shown and including an opening 12 framed by a structure, for example sides 14 and 16 and floor 18. The closure or gate construction 20 is fitted in the opening 12 and bolted as at 22 or otherwise fastened in place. The closure consists of a frame 26, the latter having sides 28 and 30 connected together by a header 32 and by a sill 34. The frame 26 is generally rectangular in configuration and is preferably made of all welded tubing. The bolts 22 pass through the apertures in the sides 28 and 30 so that the frame 16 forms a strengthening and rigidifying device for the vehicle body.

Two similar panels 36 and 38 are mounted in the frame 26. Panel 36 comprises posts 40 and 42 that are spaced from each other and held in rigid parallel relationship by means of cross bars 44. Hangers 46 and 48 are secured to the upper ends of posts 40 and 42. Each hanger consists of a fork that has sides together with a cross member connecting the sides and holding them in parallel relationship to each other. An upper header contacting member is disposed between the sides as is a lower header contacting member. An identical arrangement is provided at the top end of post 42.

The lower end of posts 40 and 42 have a sliding connection with the sill 34. This sliding connection is established by shoes 50 and 52 respectively, each shoe being a semi-circular saddle bearing.

The panel 38 consists of posts 60 and 62 connected together by means of cross bars 64. The cross bars may be welded or otherwise rigidly fixed to the preferably tubular posts 60 and 62. The upper ends of these posts are fitted with hangers 66 and 68, the hangers 68 typifying all of the other hangers and being of identical construction. As seen in Figure 4 it comprises a fork having sides 70 and 71 that are connected together by means of a cross member 72 at one pair of ends thereof. Header contacting upper and lower elements are located between sides 70 and 71. The upper header contacting element consists of a bolt 74 passed through aligned apertures in sides 70 and 71 and having a sleeve 75 thereon. The sleeve functions as a roller on the upper surface of the header 32. Bolt 76 passes through aligned apertures in the sides 70 and 71 and has a sleeve 78 thereon. This sleeve also functions as a roller in order to establish a smoothly operating, easily slidable gate. The lower end of posts 60 and 62 are fitted with sliding elements that fit on the sill 34. Each sliding element is a shoe 80 and 81 respectively and each is a semi-circular saddle bearing which slides easily on the tubular sill 34.

As seen best in Figure 3 panel 36 is offset to one side of its hangers 46 and 48. This is accomplished by welding or otherwise fixing the posts 40 and 42 to one side of the cross members of the forks of hangers 46 and 48. The panel 38 is offset from the center line of its hangers 66 and 68 and on the opposite side of panel 36. In this way the panels are slidable with respect to each other so that they overlap when opening the closure.

In use the frame 26 is bolted or otherwise rigidly fixed in place in the vehicle body as described herein. Then in order to load or unload the vehicle body it is necessary only to slide one or both of the panels in order to establish an opening for ingress or egress of livestock, other animals or equipment, grain or other material which is to be transported by the vehicle. The panels need not be separated from the vehicle body nor need they be swung to any position for opening and closing them. They merely slide very smoothly from one position to another and in a single vertical plane.

A locking device for holding the panels closed may be used. The length of rope 86 tied around the posts 42 and 60 typifies a suitable device for fastening the panels in the closed position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle body having structure which frames an opening, a closure for said opening, said closure comprising a frame having a pair of sides and a header, a pair of panels between said sides and having portions that are overlapped, hangers secured to the overlapped portion of said panels and at least one hanger including a fork having sides and a cross member, a header contacting element carried by the sides of said fork, one of said panels being secured to said cross member at a place which is offset from a center line of said fork, and a hanger for the other panel having a portion of that panel connected to the last-mentioned hanger in a position offset oppositely from the first mentioned offset.

2. In a vehicle body having structure which frames an opening, a closure for said opening, said closure comprising a frame having a pair of sides and a header, a pair of panels between said sides and having portions that are overlapped, hangers secured to the overlapped portions of said panels and at least one hanger including a fork having sides and a cross member, a header contacting element carried by the sides of said fork, a sill secured to said frame sides, and downwardly opening shoes secured to the overlapped portion of said panels and slidably mounted on said sill for slidably supporting the lower ends of panels on said sill.

3. For use in a vehicle body, a substantially rectangular frame defining an entrance for the vehicle body, said frame including sides, a header and a sill, said header and sill connected to said sides and holding them in generally parallel relationship to each other, overlapped panels slidable between said sides and on said header and sill, each panel including a pair of posts which are parts of the overlapped portions of said panels, hangers at the upper ends of said posts and disposed on said header, and shoes secured to the lower ends of said posts and slidable on said sill, said header and said sills being tubular, said shoes being substantially semi-circular saddle bearings and disposed on said tubular sill.

4. The combination of claim 3 wherein each of said hangers includes a fork having sides and a cross member, means between said sides of said fork for contacting said header and rollingly supporting said panels thereon.

5. The combination of claim 3 wherein there are means operatively connected with said panels to releasably hold said panels in a position to close said entrance of the vehicle body.

6. The combination of claim 1 wherein there are downwardly opening shoes secured to the lower edges of said panels and slidably mounted on said sill, said shoes of one panel being offset in one direction with respect to the plane of that panel and said shoes of the other panel being offset in the opposite direction from the plane of said other panel, and said sill forming means to prevent lateral separation of said panels with respect to each other while permitting said panels to be slid to various selected overlapped positions.

References Cited in the file of this patent
UNITED STATES PATENTS

| | | |
|---|---|---|
| 259,716 | Prescott | June 20, 1882 |
| 665,036 | Smith | Jan. 1, 1901 |
| 947,947 | Schnoor | Feb. 1, 1910 |
| 998,198 | Mull | July 18, 1911 |
| 1,836,522 | Bayles | Dec. 15, 1931 |

FOREIGN PATENTS

| | | |
|---|---|---|
| 741,835 | Great Britain | May 14, 1954 |